United States Patent [19]
Alferness

[11] 4,273,411
[45] Jun. 16, 1981

[54] OPTICAL WAVELENGTH FILTER

[75] Inventor: Rodney C. Alferness, Holmdel, N.J.

[73] Assignee: Bell Telephone Laboratories, Incorporated, Murray Hill, N.J.

[21] Appl. No.: 114,832

[22] Filed: Jan. 24, 1980

[51] Int. Cl.³ .............................................. G02B 5/14
[52] U.S. Cl. .................................. 350/96.14; 350/355
[58] Field of Search ............... 350/96.12, 96.13, 96.14, 350/355

[56] References Cited

U.S. PATENT DOCUMENTS

| | | | |
|---|---|---|---|
| 3,877,781 | 4/1975 | Kaminow | 350/96.14 |
| 3,877,782 | 4/1975 | Kaminow | 350/96.14 |
| 3,920,314 | 11/1975 | Yajima | 350/96.12 |
| 4,026,632 | 5/1977 | Hill et al. | 350/96.14 X |
| 4,146,297 | 3/1979 | Alferness et al. | 350/96.14 |

OTHER PUBLICATIONS

Yariv, "Coupled-Mode Theory For Guided-Wave Optics," *IEEE J.Q.E.*, vol. QE-9, No. 9, Sep. 1973, pp. 919-933.

Lee et al., "Electrooptic Guided-To-Unguided Mode Converter," *IEEE J.Q.E.*, vol. QE-12, No. 5, May 1976, pp. 273-281.

Alferness, "Optical Directional Couplers With Weighted Coupling," *A.P.L.*, vol. 35, No. 3, Aug. 1979, pp. 260-262.

Alferness, "Efficient, Waveguide Electro-Optic TE⇌TM Mode Converter/Wavelength Filter," Post Deadline Papers, Optical Commun. Conf., Amsterdam, Sep. 1979, pp. 19.6-1 to 19.6-4.

*Primary Examiner*—John K. Corbin
*Assistant Examiner*—John D. Lee
*Attorney, Agent, or Firm*—Sylvan Sherman

[57] ABSTRACT

An optical TE⇌TM mode converter, using highly birefringent materials such as lithium niobate, is wavelength sensitive and, as such, can be used as a wavelength filter. However, to extract the filtered (i.e., the mode converted) signal, a separate, high quality polarization selective element is required. This application discloses means for eliminating the need for a separate polarization sensing element by using mode conversion as a means for spatially separating the filtered signal. The filter comprises a pair of mismatched waveguides (11, 12), and phase matching means (14, 15) for producing selective coupling between TE mode wave energy in one of the guides and TM mode wave energy on the other guide.

19 Claims, 7 Drawing Figures

OPTICAL WAVELENGTH FILTER

TECHNICAL FIELD

This application relates to optical filters.

BACKGROUND OF THE INVENTION

Recently electrooptic TE⇌TM mode conversion has been demonstrated in Ti-diffused lithium niobate waveguides. (See, for example, the article by R. C. Alferness entitled "Efficient, Waveguide Electrooptic TE⇌TM Mode Converter/Wavelength Filter" published among the *Post deadline papers of the Optical Communication Conference,* Amsterdam, Sept. 17–19, 1979, pp. 19.6–1 to 4.) Because of the large birefringence of lithium niobate, periodic coupling is required to achieve phase-matching. This, in turn, makes the device highly wavelength selective. As a result, such a structure can be used as a wavelength filter. However, to extract the filtered (i.e., the mode converted) signal, a separate polarization selective element is required. Furthermore, the polarization sensing element must be of a high quality in order to satisfy the stringent requirements needed to avoid crosstalk in the system.

It is, accordingly, the broad object of this invention to effect wavelength filtering using mode conversion techniques which spatially separate the filtered signal from the rest of the signal, thereby avoiding the need of a separate polarization selective element.

SUMMARY OF THE INVENTION

A wavelength filter, in accordance with the present invention, utilizes phase matched electrooptic TE⇌TM mode conversion between a pair of mismatched optical waveguides to spatially separate the filtered signal. While the waveguides are in coupling relation over a prescribed interval, their transmission constants are designed to be sufficiently different so as to preclude unrestricted coupling between the two guides. Selective coupling at a prescribed wavelength is obtained by establishing, at particularly spaced longitudinal intervals within the region between the waveguides, an electric field whose direction is such as to produce mode conversion between the wave energy propagating in one mode in the input waveguide and the wave energy coupled to an orthogonal mode in the output waveguide.

Electrode configurations are described for both z-cut and x-cut electrooptic material.

It is an advantage of the present invention that wavelength filtering is obtained by spatially separating the mode converted signal, thus eliminating the need for a separate polarization sensing element. In addition, by eliminating this element, wavelength filters that are substantially polarization insensitive are realized.

DETAILED DESCRIPTION

Figure 1:
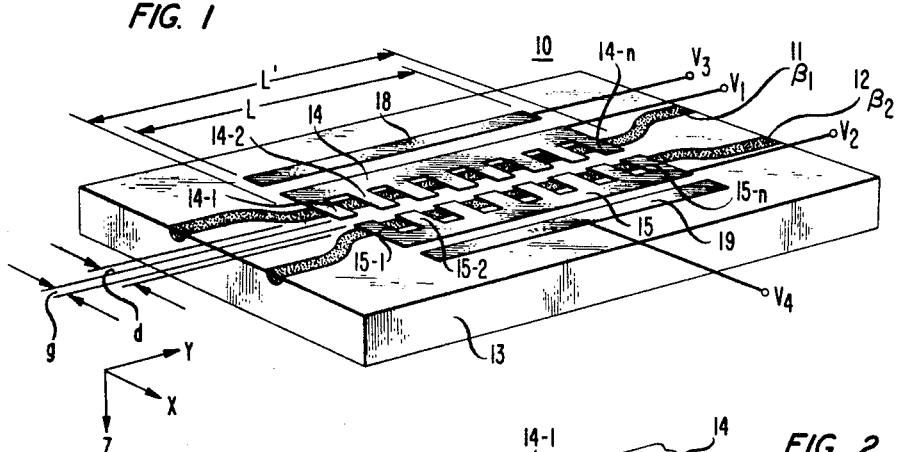
FIG. 1 shows a first embodiment of a filter in accordance with the invention.

Referring to the drawings, FIG. 1 shows a first embodiment of a wavelength filter 10, in accordance with the present invention, comprising a pair of dielectric waveguides 11 and 12 embedded in an electrooptic substrate 13 of lower refractive index. As will be explained in greater detail hereinbelow, the phase constants $\beta_1$ and $\beta_2$ of the waveguides 11 and 12, respectively, are designed to be sufficiently different such that there is insignificant coupling of optical energy between the guides notwithstanding the fact that the guides are in coupling relationship with each other over an interval L'. In an illustrative embodiment using a lithium niobate substrate, waveguides having unequal propagation constants were made by diffusing unequal amounts of titanium into the substrate. One guide was made from a 325 Å thick strip of titanium whereas the other guide was made from a 250 Å thick strip. Diffusion was for a period of four hours at 980° C. in flowing argon. The resulting waveguides have equal widths and depths but unequal $\beta$s due to the difference in the concentrations of titanium.

Electrooptic polarization conversion requires the application of an external electric field, and the proper crystal and field configuration to utilize an off-diagonal element of the dielectric perturbation tensor in order to achieve coupling between the otherwise orthogonally polarized, and uncoupled TE and TM modes. The matrix equation relating the differently polarized input and output light components is given by $$\begin{matrix} E_{xo} \\ E_{yo} \\ E_{zo} \end{matrix} = \begin{pmatrix} (-r_{22}V_y + r_{13}V_3) & r_{22}V_x & r_{51}V_x \\ r_{22}V_x & (r_{22}V_y r_{13}V_z) & r_{51}V_y \\ r_{51}V_x & r_{51}V_y & r_{33}V_z \end{pmatrix} \begin{matrix} E_{xi} \\ E_{yi} \\ E_{zi} \end{matrix} \quad (1)$$

where $E_{xi}$, $E_{yi}$ and $E_{zi}$ are the x, y and z polarized input signal components;

$E_{xo}$, $E_{yo}$ and $E_{zo}$ are the x, y and z polarized output signal components;

$V_x$, $V_y$ and $V_z$ are the x, y and z field components produced by an externally applied voltage;

and the 3×3 matrix is the reduced perturbed dielectric tensor for the electrooptic material.

As can be seen, the dielectric tensor is zero in the absence of an externally applied field. To produce polarization conversion, externally applied fields, involving an off-diagonal element, must be applied. To modulate a like polarized wave component, an on-diagonal element must be used.

In addition, in birefringent materials such as, for example, lithium niobate, the coupling must be periodic in order to establish a phase match between the two modes. Both of these conditions are satisfied, in accordance with a first embodiment of the present invention, by superimposing a pair of finger electrodes 14 and 15 upon waveguides 11 and 12 within the coupling interval L, such that fingers 14-1, 14-2 . . . 14-n of electrode 14 are aligned directly opposite fingers 15-1, 15-2 . . . 15-n of electrode 15. Advantageously, the finger ends of the electrodes are symmetrically positioned above the inside edges of the underlying waveguides such that the space d between the electrodes is substantially equal to or slightly less than the distance, g, between the guides. In addition, the width of the several fingers, and the spaces between them are uniform over the entire lengths of the electrodes. Voltages $V_1$ and $V_2$ are applied to the respective electrodes.

A second pair of uniform electrodes 18 and 19 are included for reasons that will be explained hereinbelow.

As noted hereinabove, it is possible to couple between orthogonally polarized waves propagating within an electrooptical material by the application of an appropriately directed electric field. Furthermore, it is also known that the efficiency with which this coupling occurs depends upon the degree of phase-matching for the two coupled modes. (See, for example, U.S. Pat. No. 3,877,782, and "Coupled-Mode Theory for Guided-Wave Optics" by Amnon Yariv, published in the September 1973 issue of the *IEEE Journal of Quantum Electronics*, Vol. QE-9, No. 9, pp. 919-933.) In accordance with the present invention, mode conversion is induced primarily with respect to wave energy coupled between guides 11 and 12. Why this is so is apparent from FIG. 2 which shows a transverse section of filter 10, including waveguides 11 and 12 and a pair of electrode fingers 14-1 and 15-1. As can be seen, the two lines of electric field 20 and 21 extending between the electrode fingers are directed primarily in the z direction within the waveguides and in the x direction between the waveguides. Thus, by using a z-cut crystal for the substrate, there is substantially no mode conversion induced by the z-directed electric fields within the guides. However, there is a strong mode conversion effect induced by the x-directed field as to wave energy coupled between the guides. For lithium niobate the $r_{51}$ coupling coefficient is involved. It should be noted that while some of the evanescent field associated with the guided wave also experiences some mode conversion, this has been found not to be significant.

As indicated hereinabove, the two guides 11 and 12 are deliberately made to be sufficiently different so as to preclude unrestricted coupling therebetween. Selective coupling as between one mode in one waveguide and an orthogonal mode in the second waveguide is obtained by selective phase matching of the two modes by the periodic spacing of the fingers. In particular, at a wavelength $\lambda_o$, phase matching between modes is obtained when $$\frac{2\pi}{\lambda_o}[N_{(TE)11} - N_{(TM)12}] = \frac{2\pi}{\Lambda}, \quad (2)$$

where $N_{(TE)11}$ is the effective refractive index seen by the TE mode in waveguide 11;

$N_{(TM)12}$ is the effective refractive index seen by the TM mode in waveguide 12;

and $\Lambda$ is the finger-to-finger spacing.

For conversion between the TM mode in guide 11 and the TE mode in guide 12, phase match obtains when $$\frac{2\pi}{\lambda_o}[N_{(TM)11} - N_{(TE)12}] = \frac{2\pi}{\Lambda} \quad (3)$$

It will be noted that, in general, due to the intentional mismatching of waveguides 11 and 12, $N_{(TM)11}$ is not necessarily equal to $N_{(TM)12}$ and $N_{(TE)11}$ is not necessarily equal to $N_{(TE)12}$. As a consequence, the wavelength, $\lambda_o$, at which optimum coupling occurs for a given finger spacing depends upon the polarization of the incident light. That is, $\lambda_o$ is different for conversion from TM to TE than it is for conversion from TE to TM. However, as a practical matter, this difference can be sufficiently small such that the wavelength difference for the two polarizations is less than the bandwidth of the dropped channel, in which case the filter is essentially polarization insensitive.

The length L of the electrodes for complete signal transfer between waveguides is related to the coupling coefficient $\kappa$ by $$\kappa L = \pi/2 \quad (4)$$

where $$\kappa = \frac{r_{nm}V}{d} \cdot \alpha \cdot \frac{\pi n^3}{\lambda_o \gamma} \cdot A \quad (5)$$

Figure 3:
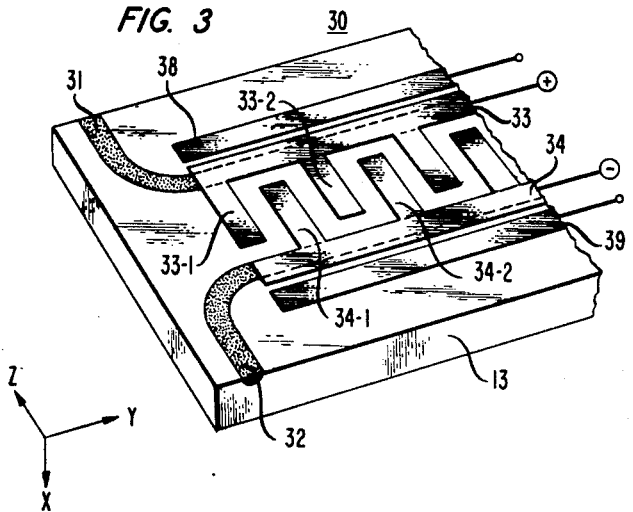
FIG. 3 shows a second embodiment of the invention.

$r_{nm}$ is the electrooptical coupling coefficient;

$n = \sqrt{n_e n_o}$;

V is the voltage between the electrodes;

d is the electrode-to-electrode gap between fingers;

$\alpha$ is the normalized overlap integral (related to the electric fields of the two modes and the applied electrode field) having a value between zero and one;

and A is the aspect radio of the electrodes, i.e., $A = a/b$;

$\gamma$ is a constant equal to 2 for finger electrodes, as in FIG. 1, and one for interdigital electrodes, as in FIG. 3.

Figure 2:
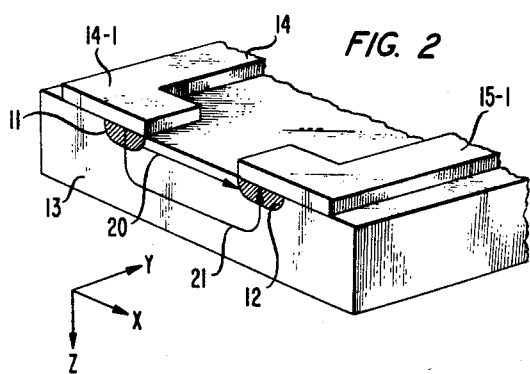
FIG. 2, included for purposes of explanation, shows the electric field distribution between electrodes in a transverse section of the filter illustrated in FIG. 1.

It is apparent from equations (2) and (3) that the wavelength, $\lambda_o$, for most efficient mode coupling is a function of the difference in the effective refractive indices $[(N_{(TE)11} - N_{(TM)12})$ and $(N_{(TM)11} - N_{(TE)12})]$ of the two waveguides. Thus, if means are provided for changing either or both of the effective indices, the filter can be tuned. This, in accordance with the present invention, is accomplished by means of the second set of electrodes 18 and 19, to which voltages $V_3$ and $V_4$ are respectively applied. As illustrated in FIG. 2, a voltage difference between electrodes 14 and 15 results in a z-directed electric field in the regions of waveguides 14 and 15. Similarly, a voltage difference between each pair of electrodes 14-18 and 15-19 also results in a z-directed component of electric field in the regions of the waveguides. It is this component which can be independently varied (without effecting the mode coupling capability of the device) as a means for varying the effective refractive index of the respective waveguides.

For purposes of explanation, we consider the particular case wherein the incident signal in waveguide 11 is propagating in the TE mode and the coupled signal in waveguide 12 is propagating in the TM mode. However, as will also be shown, the tuning arrangement illustrated in FIG. 1 can be readily made polarization insensitive such that the polarization of the respective signals can be completely arbitrary.

For the z-cut crystal of FIG. 1, $N_{(TE)11}$ is basically equal to the extraordinary refractive index, $n_o$, of the crystal, and $N_{(TM)12}$ is basically equal to the ordinary refractive index, $n_e$. As can be seen from the matrix equation (1), both of these can be modified by a z-directed electric field such that the net effective indices $n_e'$ and $n_o'$ are $$n_e' = N_{(TM)11} + (V_3 - V_1)r_{33} \quad (6)$$

and $$n_o' = N_{(TE)12} + (V_4 - V_2)r_{13}$$

(To simplify the mathematics, proportionality constants have been omitted.)

Accordingly, $$(n_e' - n_o') = [N_{(TM)11} - N_{(TE)12}] + (V_3 - V_1)r_{33} - (V_4 - V_2)r_{13}. \quad (7)$$

If, in addition, $V_4 - V_2$ is made equal to $V_3 - V_1$, equation (7) reduces to $$(n_e' - n_o') = [N_{(TM)11} - N_{(TE)12}] - \Delta(r_{33} - r_{13}) \quad (8)$$

where $$V = V_4 - V_2 = V_3 - V_1.$$

Similarly, if the signal in waveguide 11 is in the TM mode and the signal in waveguide 12 is in the TE mode, the resulting expression obtained is $$(n_o' - n_e') = [N_{(TE)11} - N_{(TM)12}] - \Delta V(r_{33} - r_{13}) \quad (9)$$

Thus, we see that by the application of a z-directed field component to the waveguides, the difference in refractive indices can be changed, thereby changing the wavelength, $\lambda_o$, at which mode conversion takes place. Furthermore, it is shown that for the symmetrical embodiment of FIG. 1, the change produced can be made the same for both polarizations. The resulting tuning is, thus, polarization insensitive.

Applying the above-discussed principles, various other electrode configurations can be devised. For example, FIG. 3 shows an alternate embodiment of the invention employing a symmetrical electrode configuration in which the electrode fingers are interleaved. The filter 30, as in the embodiment of FIG. 1, comprises a pair of dissimilar waveguides 31 and 32 that extend in coupling relationship over a defined interval. Within that interval there are superimposed over said waveguides a pair of finger electrodes 33 and 34. In particular, the fingers are interleaved in the region between the two waveguides. Thus, as illustrated, finger 34-n of electrode 34 is situated between fingers 33-n and 33-(n+1) of electrode 33, and extends between the adjacent edges of the two waveguides.

Figure 4:
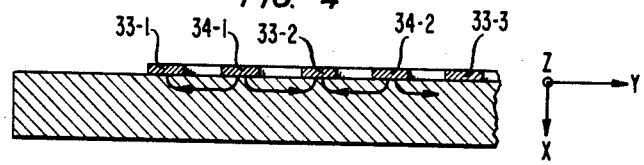
FIG. 4, included for purposes of explanation, shows the electric field distribution between electrodes in a longitudinal section of the filter illustrated in FIG. 3.

FIG. 4 shows a longitudinal cross section of filter 30 and, in particular, the electric field configuration within the coupling region. Of particular interest is the vertical field component directly under each electrode. By using, for example, an x-cut, y-propagating lithium niobate crystal, mode conversion is obtained within the region under each electrode finger due to the x-directed field component. Alternatively, a y-cut, x-propagating structure and a y-directed field can be used. In either case, it is an advantage of this electrode configuration that for a given electrode voltage, twice as much mode conversion results due to the push-pull effect of the field configuration, (i.e., $\kappa$ is twice as large as indicated in Eq. (4)). In addition, it has been found that the overlap integral for this electrode configuration is more favorable.

Match conditions are established as before by satisfying equations (1) and/or (2).

Figure 5:
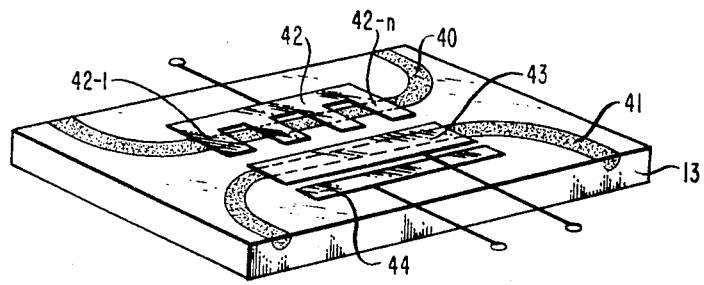
FIG. 5 shows a third embodiment of the invention.

FIG. 5 shows a filter, in accordance with the invention, employing an asymmetric electrode configuration. In this embodiment, a first finger electrode 42 is disposed over one waveguide 40 and a simple uniform electrode 43 is disposed over the second waveguide 41. As is evident, this arrangement provides the periodic coupling for mode matching. However, in this configuration, the periodicity of the coupling is not as clearly defined, which can result in less effective mode matching.

A second, uniform electrode 44 provides wavelength tuning. However, because of the asymmetry of the structure, the tuning is not polarization insensitive. It is an advantage of this structure, however, that the uniform electrode 43 over waveguide 41 precludes the possibility of mode conversion within waveguide 41 itself.

Figure 6:
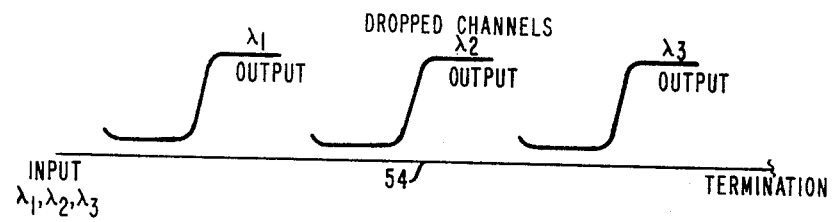
FIG. 6 shows the use of a plurality of filters for channel separation purposes.

FIG. 6 illustrates the use of a cascade of filters 50, 51 and 52, of the type depicted in FIGS. 1, 2 and 3, for channel separation purposes. In operation, a wavelength multiplexed input signal, including channels centered at wavelengths $\lambda_1$, $\lambda_2$ and $\lambda_3$, traverses, in turn, each of the filters wherein wave energy, centered at one of the wavelengths $\lambda_1$, $\lambda_2$ and $\lambda_3$, respectively, is coupled out of the through signal path 54 by means of the above-described mode conversion process.

Various modifications of the basic filter structures described hereinabove can be made for particular applications. As explained in applicant's copending application Ser. No. 77,092, filed Sept. 19, 1979, the coupling characteristic of a directional coupler, as a function of wavelength, includes a number of sidelobes. Thus, a filter in accordance with the present invention will couple energy centered about the desired wavelength, $\lambda_o$, as well as at wavelengths displaced from $\lambda_o$ by multiples of twice the filter bandwidth. As pointed out in the above-cited application, these spurious responses can be minimized by weighing the coupling coefficient, $\kappa$, over the coupling interval L. This can be conveniently done, for example, by varying the distance g between guides (i.e., by curving one or both of the guides).

Figure 7:
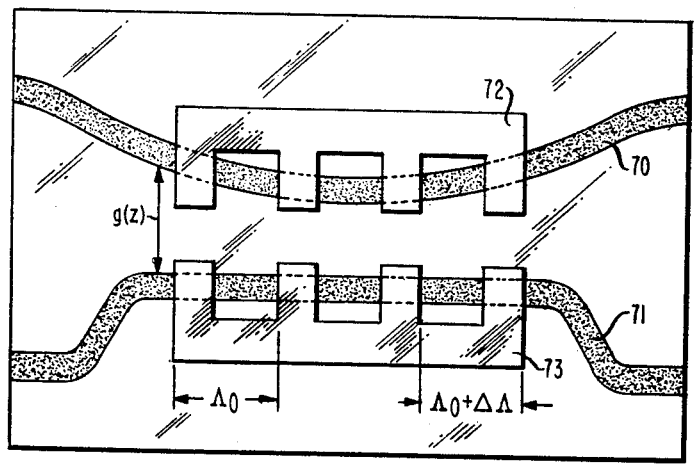
FIG. 7 shows a fourth embodiment of the invention.

A second modification of the basic structure includes varying the spatial wavelength, $\Lambda$, of the electrode fingers over the coupling interval as a means of broadbanding the filter response. Thus, for example, the spatial wavelength can be varied linearly over the length of the electrodes from a first value $\Lambda_o$ at one end of the electrodes to a second value $\Lambda_o + \Delta\Lambda$ at the other end. FIG. 7 shows the waveguide and electrode arrangements incorporating both of these modifications. In this embodiment, waveguide 70 is curved so that the distance g(z) between waveguides 70 and 71 varies as a function of the distance along the guides. Broadbanding is obtained by varying the finger-to-finger spacings along electrodes 72 and 73.

In the description of the invention given hereinabove, lithium niobate was referred to as an illustrative electrooptic material. Other examples are lithium tantalate or any other materials that have a $C_{3V}$ crystal structure. More generally, any birefringent material that is low loss at the wavelength of interest and whose electrooptic perturbation tensor has off-diagonal components can be used to practice the invention.

I claim:
1. A filter comprising:
a pair of optical waveguides (11, 12) embedded in a substrate (13) of electrooptical material of lower refractive index;
characterized in that:
said waveguides (11, 12) are in coupling relationship over an interval L' but have sufficiently dissimilar propagation constants ($\beta_1$, $\beta_2$) to preclude unrestricted coupling therebetween;

and in that coupling means (14-1, 14-2 ... 14-n; 15-1, 15-2 ... 15-n) are longitudinally spaced along said interval for inducing selective coupling between wave energy at a wavelength $\lambda_o$ of one polarization (TE, TM) in one of said waveguides (11) and wave energy of an orthogonal polarization (TM, TE) in the other (12) of said waveguides.

2. The filter according to claim 1 characterized in that:
said coupling means produce electric fields within said substrate which induce TE⇌TM mode conversion.

3. The filter according to claim 2 characterized in that:
said substrate is a z-cut crystal;
said waveguides are y-propagating;
and in that said electric fields have x-directed components in the portion of said substrate between said waveguides.

4. The filter according to claim 2 characterized in that:
said substrate is an x-cut crystal;
said waveguides are y-propagating;
and in that said electric fields have x-directed components in the portion of said substrate between said waveguides.

5. The filter according to claim 2 characterized in that:
said substrate is a y-cut crystal;
said waveguides are x-propagating;
and in that said electric fields have y-directed components in the portion of said substrate between said waveguides.

6. The filter according to claim 1 characterized in that:
the wavelength, $\lambda_o$, of the coupled wave energy is related to the spatial wavelength $\Lambda$ of said coupling means by $$\frac{2\pi}{\lambda_o}[N_{(TE)11} - N_{(TM)12}] = \frac{2\pi}{\Lambda},$$

where $N_{(TE)11}$ is the effective refractive index for the TE mode in one waveguide (11), and $N_{(TM)12}$ is the effective refractive index for the TM mode in the other waveguide (12).

7. The filter according to claim 1 characterized in that:
said coupling means comprises a pair of electrodes (14-15, 33-34, 42-43) for producing periodic regions of electric field within the portion of said substrate (13) between said waveguides (11-12, 31-32, 40-41).

8. The filter according to claim 7 characterized in that:
one of said electrodes (42) comprises a plurality of fingers (42-1, 42-2 ... 42-n) whose ends extend into the portion of said substrate (13) between said waveguides (40, 41);
and in that the other of said electrodes (43) is uniform over its entire length.

9. The filter according to claim 7 characterized in that:
said electrodes (14, 15) have fingers (14-1, 14-2 ... 14-n; 15-1, 15-2 ... 15-n) whose ends are symmetrically positioned above the inside edges of said waveguides (11, 12) directly opposite each other such that the space between opposite fingers (14-1, 15-1; 14-2, 15-2 ... 14-n, 15-n) is equal to or less than the space between said waveguides.

10. The filter according to claim 7 characterized in that:
said electrodes (33-34) have fingers (33-1, 33-2 ... 33-n, 34-1, 34-2 ... 34-n) that are interleaved over the portion of said substrate between said waveguides (31, 32).

11. The filter according to claim 1 characterized in that:
said material is lithium niobate.

12. The filter according to claim 1 characterized in that:
said filter includes tuning means (18-19) for changing the wavelength of said selectively coupled wave energy.

13. The filter according to claim 12 characterized in that:
said tuning means changes the ordinary refractive index ($n_o$) and the extraordinary refractive index ($n_e$) of said substrate in the region of said waveguids.

14. The filter according to claim 1 characterized in that:
the distance between said waveguides varies over said interval L'.

15. The filter according to claim 1 characterized in that:
the longitudinal space between said coupling means varies along said interval L'.

16. The filter according to claim 1 characterized in that:
said substrate material is selected from the group of materials having a $C_{3V}$ crystal structure.

17. The filter according to claim 16 characterized in that:
said substrate material is lithium niobate.

18. The filter according to claim 16 characterized in that:
said substrate material is lithium tantalate.

19. The filter according to claim 1 characterized in that:
said substrate material is birefringent, and has a dielectric perturbation tensor having off-diagonal components.

* * * * *

UNITED STATES PATENT AND TRADEMARK OFFICE
CERTIFICATE OF CORRECTION

PATENT NO. : 4,273,411
DATED : June 16, 1981
INVENTOR(S) : Rodney C. Alferness

It is certified that error appears in the above—identified patent and that said Letters Patent is hereby corrected as shown below:

Column 3, line 56, "A" should be --$\Lambda$--.
Column 4, line 24, "ais"   should be --a is--;
         line 28, "radio" should be --ratio--;
         line 29, "$\lambda$is" should be --$\gamma$ is--.
Column 5, line 13, "$\Delta$" should be --$\Delta$V--.
Column 8, line 34, "waveguids" should be --waveguides--.

Signed and Sealed this

Twenty-sixth Day of January 1982

[SEAL]

*Attest:*

GERALD J. MOSSINGHOFF

*Attesting Officer*  *Commissioner of Patents and Trademarks*